United States Patent
Hammarlund et al.

(10) Patent No.: US 7,502,892 B2
(45) Date of Patent: Mar. 10, 2009

(54) DECOUPLING REQUEST FOR OWNERSHIP TAG READS FROM DATA READ OPERATIONS

(75) Inventors: Per H. Hammarlund, Hillsboro, OR (US); Hermann W. Gartler, Portland, OR (US)

(73) Assignee: Intel Corporation, Santa Clara, CA (US)

(*) Notice: Subject to any disclaimer, the term of this patent is extended or adjusted under 35 U.S.C. 154(b) by 301 days.

(21) Appl. No.: 10/747,145

(22) Filed: Dec. 30, 2003

(65) Prior Publication Data

US 2005/0144398 A1    Jun. 30, 2005

(51) Int. Cl.
*G06F 12/00* (2006.01)

(52) U.S. Cl. .................. 711/140; 711/138; 711/156

(58) Field of Classification Search .......... 711/125, 711/137, 141, 162, 119, 122, 138, 140, 143, 711/156; 714/53
See application file for complete search history.

(56) References Cited

U.S. PATENT DOCUMENTS

| | | | | |
|---|---|---|---|---|
| 5,623,628 A | * | 4/1997 | Brayton et al. | 711/141 |
| 5,732,243 A | * | 3/1998 | McMahan | 711/137 |
| 5,771,367 A | * | 6/1998 | Beardsley et al. | 711/162 |
| 6,012,125 A | * | 1/2000 | Tran | 711/125 |
| 6,226,763 B1 | * | 5/2001 | Fu et al. | 714/53 |
| 6,971,041 B2 | * | 11/2005 | DeSota et al. | 714/6 |
| 2004/0168039 A1 | * | 8/2004 | Park | 712/1 |

FOREIGN PATENT DOCUMENTS

CN    1450457 A   * 10/2003

OTHER PUBLICATIONS

Patterson, David A., John L. Hennessy. "Computer Organization and Design: The Hardware/Software Interface." 2nd ed. Morgan Kaufmann. San Francisco, CA: 1997.*
Handy, Jim. "The Cache Memory Book." 2nd ed. Academic Press LTD. London, UK: 1998.*

* cited by examiner

*Primary Examiner*—Matt Kim
*Assistant Examiner*—Hetul Patel
(74) *Attorney, Agent, or Firm*—Kenyon & Kenyon LLP

(57) ABSTRACT

Embodiments of the present invention relate to cache coherency. In an embodiment of the invention, a cache includes one or more cache lines. A store pipeline may retrieve a tag associated with one of the cache lines. The data associated with the cache line may not retrieved and the cache line may be updated if, based on the tag, the cache line is determined to be in a modified or exclusive state.

29 Claims, 4 Drawing Sheets

DECOUPLING REQUEST FOR OWNERSHIP TAG READS FROM DATA READ OPERATIONS

BACKGROUND OF THE INVENTION

The present invention relates to an apparatus and method for an improved system of cache coherency in a multiple agent system.

In the electronic arts, a processing system may include a plurality of agents that perform coordinated computing tasks. The agents often share one or more main memory units designed to store addressable data for the use of all agents. The agents communicate with the main memory unit and each other over a communications bus during bus transactions. A typical system is shown in FIG. 1. FIG. 1 illustrates a plurality of N agents 10, 20, 30, 40 in communication with each other over an external communications bus 50. Data is exchanged among the agents 10, 20, 30 and the main memory unit 40 in a bus transaction. "Agents" include one or more processors, memory units, and devices that may communicate over the communications bus 50.

In order to improve performance, an agent may include a plurality of tiered internal caches that store and alter data on a temporary basis. In such multiple agent systems, several agents may operate on data from a single address at the same time. Multiple copies of data from a single memory address may be stored in multiple agents. Oftentimes when a first agent must operate on data at an address, a second agent may store a copy of the data that is more current in its internal cache than the copy resident in the main memory unit 40. In order to maintain "cache coherency," the first agent should read the data from the second agent rather than from the main memory unit 40. Without a means to coordinate among agents, an agent may perform a data operation on a copy of data that is stale.

Along with each unit of data, an internal cache may store additional information, which may include the data's address in the main memory unit 40, the length of the data unit, and/or an indicator as to whether the data has been modified by the agent since being retrieved from main memory. This indicator—known as the "state" of the data—may reflect that the data has been modified or unmodified since being retrieved from main memory. To monitor the states of cache lines, a technique well known in the art such as a "MESI" procedure may be used where each cache line is marked with one of four states. These states are "modified," "exclusive," "shared," and "invalid" states (MESI states). The "modified" state indicates that the cache line has an updated version of the data. The "exclusive" state indicates that the cache line is the only one with a copy of the data, i.e., it owns the right to update the data. The "shared" state indicates that other agent(s) may have a copy of the data in the cache line, and there is only a right to read the data. The "invalid" state indicates that the cache line does not have a valid copy of the cache line.

In some agents, modified or exclusive data may be returned to main memory as part of a writeback transaction. In an explicit writeback, an agent generates a bus transaction to write the modified data to external memory in order to make room in the cache for newly requested data. That is, the agent (e.g., 10 in FIG. 1) acquires ownership of the communications bus 50 and drives the modified data on the communications bus 50. The external memory (e.g., agent 40 in FIG. 1) retrieves the data from the communications bus 50 and stores it according to conventional techniques.

By contrast, an implicit writeback typically occurs as part of a transaction initiated by another agent. Consider an example where agent 10 stores a copy of data in modified state; the copy in agent 10 is more current than a copy stored in the main memory unit 40. If another agent 20 posts a request on the communications bus 50 and requests the data, an implicit writeback would cause agent 10 to provide the requested data to agent 20 rather than the main memory unit 40.

In an implicit writeback, when agent 20 posts the request each of the other non-requesting agents performs an internal check (a snoop) to determine whether it possesses a modified or exclusive copy of the data at the requested address in its internal cache system. If a non-requesting agent (agent 10 in the example) does have a modified version of the requested data in its internal cache system it so indicates in a cache coherency signal of the transaction. The agent 10 drives the modified data on the external communications bus 50. The requesting agent 20 and the main memory unit 40 may read the data from the communications bus 50.

In conventional systems, when a cache line or a portion of the cache line is updated at an agent, the agent reads the data associated with the entire cache line as well as other information such as a tag associated with the cache line. This access may be a main memory access or a cache access. The updated data is stored in a buffer associated with the agent receiving the data. The data is stored into the cache line and is written back to another agent or another level of memory such as another level of cache. If all bytes of the cache line are updated, the conventional updating process can be inefficient in that it involves two separate data accesses only one of which is actually useful. In other words, in the first data access, although the data is read, the data is not really used since it is all updated and the second access will write all of the updated data. This results in wasted resources such as wasted power resources as well as increased latencies and bandwidth utilizations since the data read utilizes the processor's resources that would otherwise be used for other processes.

DETAILED DESCRIPTION

Embodiments of the present invention provide a system, method and apparatus associated with cache coherency that reduces the number of data reads so that power savings may be realized while latency in the processor may be reduced.

Embodiments of the present invention, provide a technique related to cache coherency which may reduce the inefficiencies associated with prior art techniques. Embodiments of the present invention may minimize data accesses and/or may increase a processor's performance and may lower power requirements.

Figure 2:
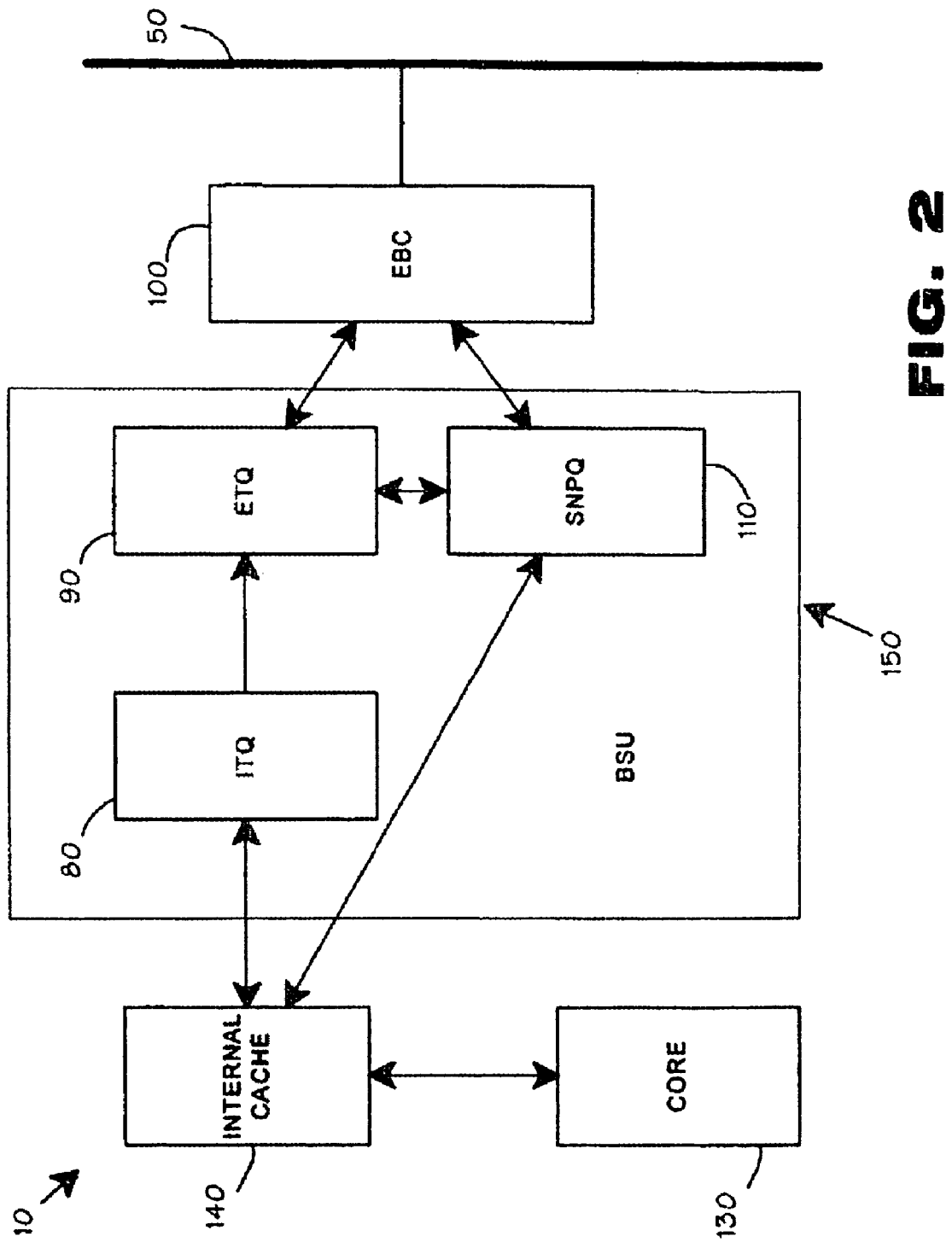
FIG. 2 is a more detailed block diagram of one of the agents in FIG. 1 in accordance with an embodiment of the present invention.

In an embodiment, the principles of the present invention may be applied in an agent 10 shown in FIG. 2. As shown in FIG. 2, the agent 10 may include a bus sequencing unit ("BSU") 150, a core 130 and an internal cache 140. The BSU may include an internal transaction queue ("ITQ") 80, an external transaction queue ("ETQ") 90, and a snoop queue ("SNPQ") 110. An external bus controller ("EBC") 100 may interface the BSU 150 to the communications bus 50. It is recognized that FIG. 2 may represent a portion of the components included in the agent 10 and that agent 10 may include additional components.

The internal cache 140 stores data in a plurality of cache entries. It possesses logic responsive to a data request to determine whether the internal cache 140 stores a valid copy of requested data and, if so, it furnishes the requested data in response thereto. Internal cache 140 may be a multi-level cache. For example, internal cache 140 may include a level 1 (L1) and a level 2 (L2) cache. It is recognized that internal cache 140 may include additional levels of cache. The bandwidth of the upper level cache (e.g., L2 cache) may be lower than the bandwidth of the lower level cache (e.g., L1 cache). The lower level cache may be a smaller yet faster cache while the upper level cache may be a larger yet slower cache.

The ITQ 80 receives and stores data requests issued by the agent core 130. It coordinates with the internal cache 140 to determine if the requested data "hits" (can be furnished by) the internal cache 140. If not, if a data request "misses" the internal cache 140, the ITQ 80 forwards the data request to the ETQ 90. The ITQ 80 may also coordinate with the internal cache 140 to process writebacks by passing along data with a modified and/or exclusive state to the ETQ 90 for eventual updating of the main memory unit 40. Such a process may be accomplished by eviction, wherein data with a modified state is evicted from a lower level of a cache to higher level of a cache. Such an eviction may occur when the lower level of cache is full and space is required for more recent cache entries.

The ETQ 90 interprets data requests and generates external bus transactions to fulfill them. The ETQ 90 may be populated by several queue entries. The ETQ 90 manages the agent's transactions as they progress on the external bus 50.

The snoop queue 110 causes cache coherency checks to be performed within the agent. Typically, in response to a new bus transaction issued by another agent, the snoop queue 110 causes the generation of snoop probes to various caches within the agent (such as internal cache 140) and to the ITQ 80 and ETQ 90. It receives responses to the snoop probes and generates snoop responses therefrom. If necessary, the snoop queue 110 manages writebacks of modified and/or exclusive data from the agent.

The external bus controller 100 drives signals on the external bus as commanded by the ETQ 90 and snoop queue 110.

Figure 1:
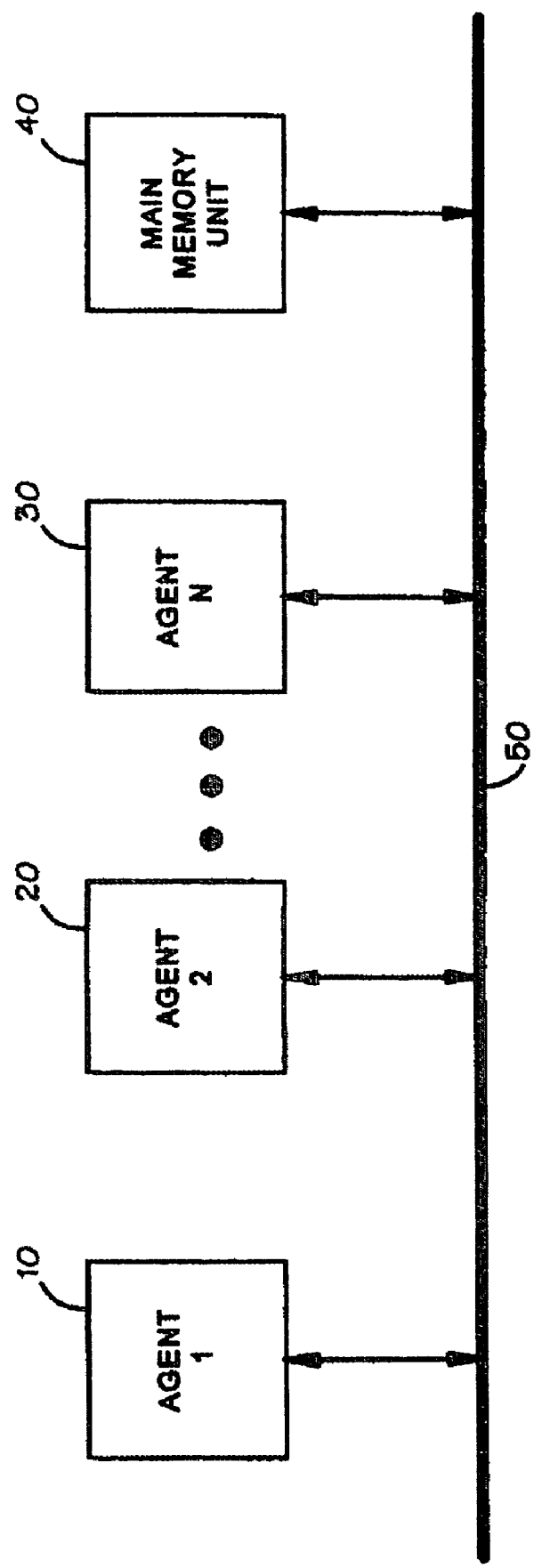
FIG. 1 is a block diagram of a multiple agent system sharing a main memory unit over a communications bus in accordance with an embodiment of the present invention.
Figure 3:
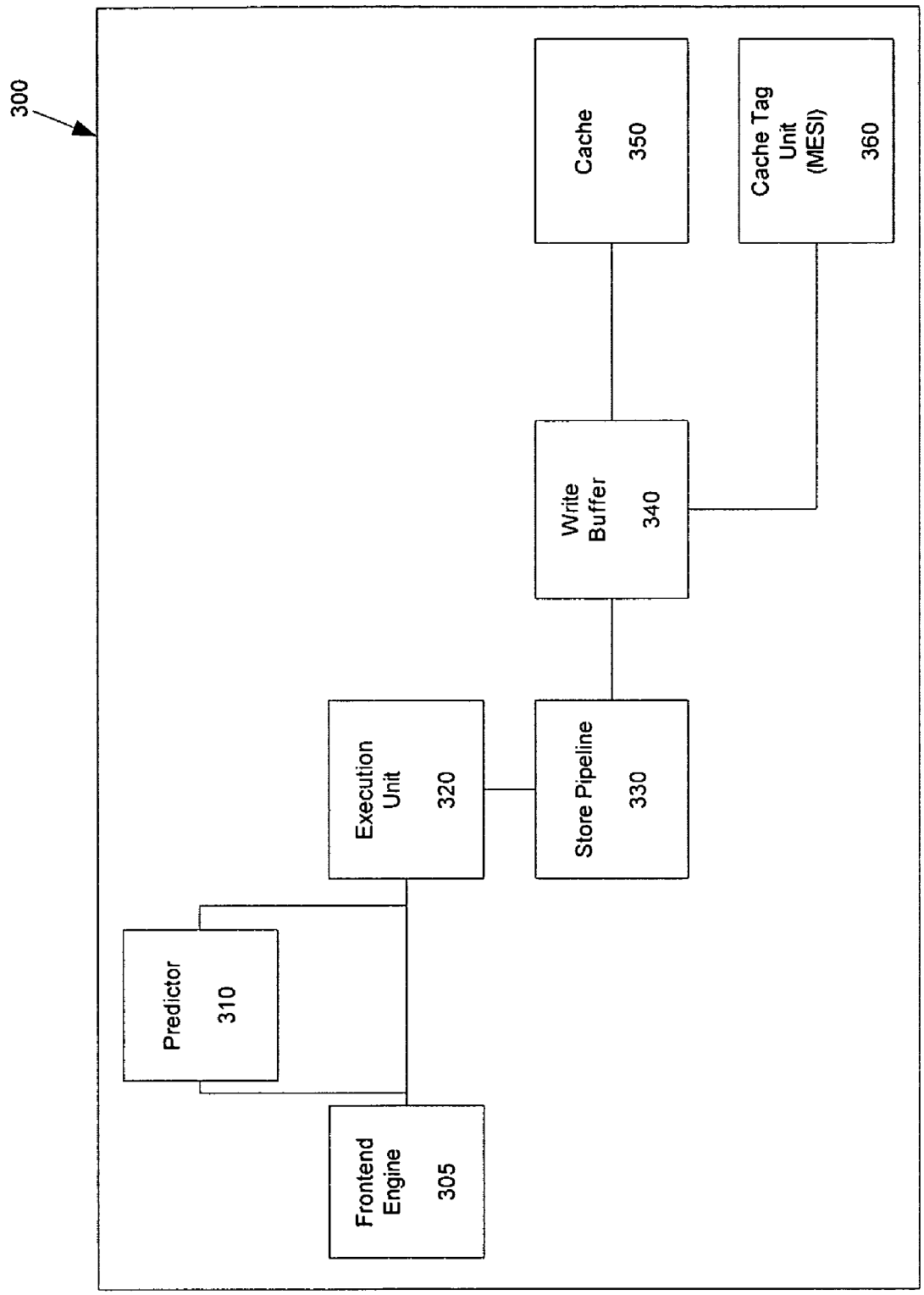
FIG. 3 is a more detailed block diagram of one of the agents in FIG. 1 in accordance with an embodiment of the present invention.

In embodiments of the present invention, if an agent receives access to or acquires ownership of a cache line, the agent may store cache line data or update the cache line, in accordance with embodiments of the present invention. FIG. 3 is a block diagram of an agent 300 in which embodiments of the present invention may be applied. Agent 300 may be any of the agents shown in FIGS. 1 and 2. In embodiments of the present invention, the components included in agent 300 may be included in any of the agents shown in FIGS. 1 and 2. It is also recognized that agent 300 may include additional components.

As shown in FIG. 3, agent 300 may include a front-end engine 305, a predictor 310, an execution unit 320, a store pipeline 330, a write buffer 340, a cache 350 and a cache tag unit 360. The front-end micro-code engine 305 may receive data and instructions that are received by the agent 300. The front-end micro-code engine 305 may specify if all bytes in the cache line will be written. Embodiments of the present invention may include a predictor 310 that may predict whether all the bytes in the cache line will be written or stored. It is also recognized that an application being operated by the agent may also indicate in the application code whether all of the bytes in the cache line will be stored. Such as application may include scientific floating point (FP) or multimedia application. Moreover, if a repeat string operation is being processed, then all the bytes in the cache line may be written and again the micro-code engine 305 may specify that all bytes are updated based on the details of the string operation.

In FIG. 3, when store pipeline 330 operates on a store, it may check whether the cache line to be updated or written is in cache 350. The store pipeline may do this by checking the cache tag unit 360 associated with the cache line. If the cache line is present in exclusive or modified state, the cache line may be updated in accordance with embodiments of the present invention. This cache tag access is performed without accessing or reading the data associated with the cache line. The cache line may be written from the store pipeline 330 to the buffer 340 and the cache line may be written back to the cache 350 from buffer 340. In embodiments of the present invention, it is recognized that the cache line may be written directly from the store pipeline 330 to the cache 350. The cache tag unit 360 associated with the cache line may be updated, if needed. For example, if the cache tag, in unit 360, was previously in an exclusive state, it may be updated to the modified state. If the cache tag associated with the cache line was previously in the modified state, it remains in the modified state.

In embodiments of the present invention, if it is determined that the entire cache line needs to be updated, the cache tag may be checked to determine whether the cache line is present in the cache. If, based on the cache tag, it is determined that the cache line is present, the state of the cache line may be analyzed. If the cache line is in exclusive or modified state, the store pipeline may be informed that the write buffer may be written. This check may occur based only on analyzing the tag and without accessing the actual data associated with the cache line. The store pipeline may update the cache line data in the write buffer. The cache line may be written back to the cache and the cache tag unit may be updated.

Figure 4:
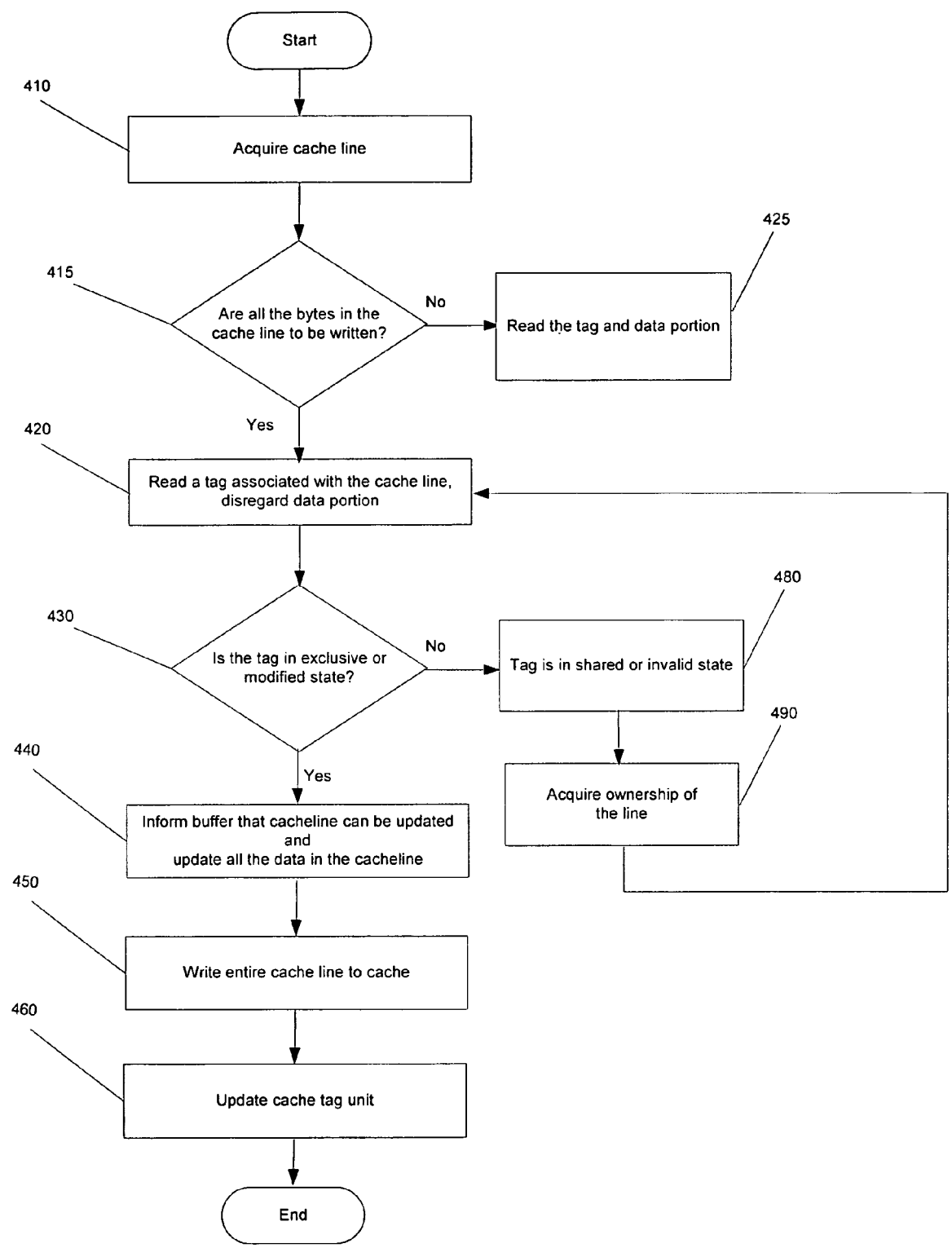
FIG. 4 is flowchart illustrating an exemplary method in accordance with an exemplary embodiment of the present invention.

FIG. 4 is a flow chart illustrating a method in accordance with an embodiment of the present invention. In an embodiment of the present invention, it may be determined whether a cache line exists in the cache and if so, the cache line may be acquired, as shown in box 410. As shown in boxes 415 and 420, if all of the bytes in the cache line are to be written, then the agent may read a tag associated with the cache line during a memory access. During the read operation, only a tag associated with the cache line may be read, the data portion of the cache line is disregarded. The data read operation of the cache line may be cancelled or not performed. Thus, the tag access may be decoupled from the data access. The tag may indicate, for example, the status of the cache line. The states may be either "modified," "exclusive," "shared," and/or invalid. As indicated above, the "modified" state indicates that the cache line has an updated version of the data. The "exclusive" state indicates that the cache line is the only one with a copy of the data, i.e., it owns the right to update the data. The "shared" state indicates that other agent(s) may have a copy of the data in the cache line, and there is only a right to read the data. The "invalid" state indicates that the cache line does not have a valid copy of the cache line. It is recognized that a tag associated with the cache line may include additional information such as address information and/or any other type of information.

If all of the bytes in the cache line are not to be written, the tag portion as well as the data portion of the cache line may be read, as shown in boxes 415 and 425. In this case, the data portion may be stored in the write buffer. The appropriate portion of the cache line data may be updated and the updated cache line may be written back.

In embodiments of the present invention, as shown in box 430, the tag may be analyzed to determine whether the cache line is in a modified or exclusive state at the source. If it is determined that the cache line is in either a modified or exclusive state, a buffer such as write buffer 240, can be informed that it can start updating all of the cache line as shown in box 440. The entire cache line (e.g., 64 bytes) may be written to the cache 350, as shown in box 450. As shown in box 460, the cache tag unit 360 may be updated. For example, the tag associated with cache line from the source may be changed from exclusive to modified state. If the cache tag is already at the modified state, this state is maintained.

In FIG. 4, in embodiments of the present invention, if the tag associated with the cache line from the source is in shared or invalid state, the associated cache line may be acquired from main memory or another agent (FIG. 1), as shown in boxes 480 and 490. When ownership of the cache line has been acquired, the algorithm may continue starting at box 420.

Embodiments of the present invention provide a write operation to a cache line, that is completely updated, that may be performed with two cache tag accesses (a read and a write) and a single write operation.

Embodiments of the present invention may provide not only a power savings but also a reduction in latency and cache data bandwidth when data is processed. For example, in embodiments of the present invention, since only a single data read is needed for a cache store or cache update, for example, power consumption is reduced. Accessing a tag only uses a fraction of the power versus accessing the data itself. Since, the tag allows the agent to determine whether a data read is necessary, the agent may conserve power resources. Moreover, the processor's latency is reduced because the agent such as a processor may only need to read and analyze the tag, a tag access has a lower latency than a data access, and does not need to read the data initially, in accordance with an embodiment of the present invention.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A processor comprising:
a cache including one or more cache lines;
a store pipeline to operate on a store, said store pipeline to retrieve a tag associated with one of the cache lines, wherein data stored in a data portion of the cache line is not retrieved and wherein the cache line is to be updated during operation of the store instruction without retrieving data stored in a data portion of the cache line in the cache if, based on the tag, the cache line is determined to be in a modified or exclusive state of a cache coherency protocol.

2. The processor of claim 1, wherein all bytes associated with the cache line are to be updated.

3. The processor of claim 1, further comprising:
a write buffer, wherein updated data is to be written in to the buffer if the cache line is determined to be in a modified or exclusive state.

4. The processor of claim 3, wherein the updated data is to be written back to the cache line from the write buffer.

5. The processor of claim 1, further comprising:
a predictor to predict that all bytes associated with the cache line are to be updated.

6. The processor of claim 1, further comprising:
a micro-code engine to indicate that all bytes associated with the cache line are to be updated.

7. The processor of claim 1, wherein an application that is being processed by the processor to indicate that all bytes associated with the cache line are to be updated.

8. The processor of claim 1, further comprising:
a cache tag unit to store the tag associated with the cache line, wherein the tag is to be updated to the modified state if the cache line is updated.

9. The processor of claim 1, further comprising:
an external bus controller to acquire ownership of the cache line if the cache line is determined to be in a shared or invalid state.

10. A method for updating a cache line of a cache comprising:
during operation of a store, examining a tag associated with the cache line, wherein data stored in a data portion of the cache line in the cache is not accessed; and
updating the cache line during operation of the store without retrieving data stored in a data portion of the cache line in the cache if, based on the tag, the cache line is in a modified or exclusive state of a cache coherency protocol.

11. The method of claim 10, wherein all bytes associated with the cache line are updated.

12. The method of claim 10, further comprising:
writing all of the bytes associated with the cache line to a buffer.

13. The method of claim 10, further comprising:
if the cache line is not in the modified or exclusive state, acquiring updated data associated with the cache line from a main memory.

14. The method of claim 10, further comprising:
changing the tag associated with the cache line to the modified state if the cache line is updated.

15. The method of claim 10, further comprising:
predicting that all bytes associated with the cache line are to be updated.

16. The method of claim 10, wherein a micro-engine indicates that all bytes associated with the cache line are to be updated.

17. The method of claim 10, further comprising:
acquiring ownership of the cache line, if the cache line is determined to be in a shared or invalid state.

18. A system comprising:
a bus;
an memory coupled to the bus; and
an agent coupled to the bus, the agent including:
a store pipeline to operate on a store, said store pipeline to examine a tag associated with a cache line, wherein data stored in a data portion of the cache line is not accessed; and
a cache line that is updated during operation of the store instruction without retrieving data stored in a data portion of the cache line if, based on the tag, the cache line is determined to be in a modified or exclusive state of a cache coherency protocol.

19. The system of claim 18, wherein the agent is a processor.

20. The system of claim 18, wherein updated data associated with the cache line is acquired from the memory, if the cache line is not in the modified or exclusive state.

21. The system of claim 18, wherein all bytes associated with the cache line are updated.

22. The system of claim 18, the agent further comprising:
a write buffer, wherein updated data is written in to the buffer if the cache line is determined to be in a modified or exclusive state.

23. The system of claim 22, the agent further comprising:
a cache that contains the cache line, wherein the updated data is written back to the cache line from the write buffer.

24. The system of claim 18, the agent further comprising:
a predictor to predict that all bytes associated with the cache line are to be updated.

25. A method comprising:
during operation of a store, accessing only a state associated with a cache line of a cache, if all bytes stored in a data portion of the cache line are to be updated;
writing updated data to a buffer, if the cache line is in an exclusive or modified state of a cache coherency protocol,
writing back all of the data from the buffer to the cache line during operation of the store without retrieving data stored in a data portion of the cache line in the cache; and
updating the state associated with the cache line.

26. The method of claim 25, further comprising:
updating the state associated with the cache line to the modified state.

27. The method of claim 25, wherein data associated with the cache is not accessed.

28. The method of claim 25, further comprising:
predicting that all bytes associated with the cache line are to be updated.

29. The method of claim 25, further comprising:
acquiring ownership of the cache line, if the cache line is in a shared or invalid state.

* * * * *